V. FELKER.
Plow-Holder and Governor.
No. {1,227, 32,231.}
Patented Apr. 30, 1861.
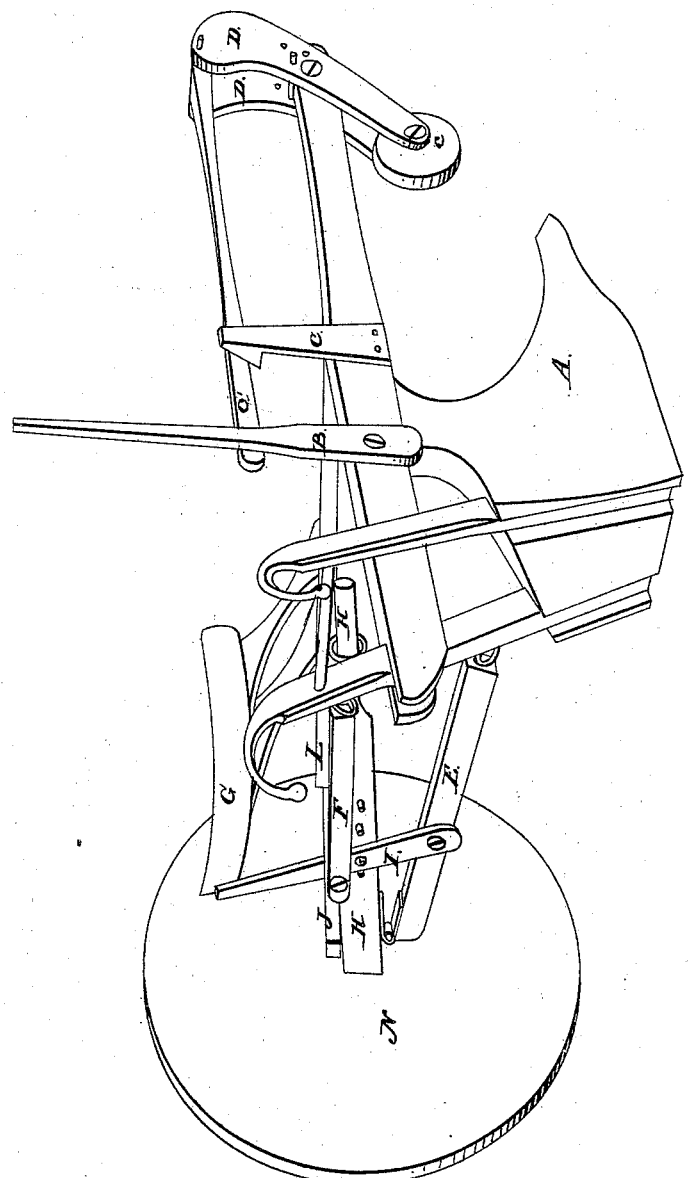

UNITED STATES PATENT OFFICE.

VALENTINE FELKER, OF CARMEL, MAINE, ASSIGNOR TO HIMSELF AND RUFUS JONES, OF SAME PLACE.

IMPROVEMENT IN PLOWS.

Specification forming part of Letters Patent No. 32,231, dated April 30, 1861.

*To all whom it may concern:*

Be it known that I, VALENTINE FELKER, of Carmel, in the county of Penobscot and State of Maine, have invented a new and Improved Plow Holder and Governor; and I do hereby declare that the following is a full and exact description thereof, reference being had to the accompanying drawing, and to the letters of reference marked thereon, said drawing being a perspective view of the holder and governor attached to a common plow.

To enable others skilled in the art to make and use my invention, I will proceed to describe its construction and operation.

In the drawing, A is the plow, which may be of any form or kind.

N is the wheel, which may be of any ordinary construction, and should usually be about four feet in diameter. This wheel is attached to and revolves upon the axle H, which passes through and plays loosely in an eyebolt in the landside-handle, as shown.

J is a brace or stay fastened to the axle, and, extending forward, is connected by a hinged joint to the beam near its forward end.

L is a stay connected with the axle and brace or stay J, and upon the two stays the seat G is mounted.

E is a brace hinged to the axle and the landside-handle. I is a lever fastened to the brace E, and connected with the landside-handle by the rod F, and by actuating the lever I the width of furrow is determined, for by moving the lever toward the wheel the plow is canted to the land side and the furrow narrowed, and vice versa.

The wheel F and its described attachments I term my "plow-holder."

D D are two jaws or clamps fastened to the beam by a bolt on which they vibrate. $e$ is a truck revolving between the jaws.

B is a lever attached to the beam and connected with the jaws by the rod $c'$, and by drawing the lever B back the truck $e$ is depressed and the plow thrown out of the ground. The catch C holds the jaws in an upright position, and when it is desired to let the plow take the ground it is only necessary to release the rod $c'$ from the catch C, and the friction upon the truck instantly raises it as desired. By changing the position of the pin $a$, the depth of furrow can be varied as desired.

The truck $e$ and the mechanism by which it is actuated and controlled I term my "plow-governor."

What I claim as my invention, and desire to secure by Letters Patent, is—

The arrangement of the plow-holder as constructed of parts N, H, I, F, E, and J, attached to plow H, with plow-governor B, operating as described, and for the purpose set forth.

VALENTINE FELKER.

Witnesses:
J. H. PERKINS,
T. W. PORTER.